United States Patent [19]
Ostrowsky et al.

[11] 3,896,305
[45] July 22, 1975

[54] INTEGRATED OPTICAL DEVICE ASSOCIATING A WAVEGUIDE AND A PHOTODETECTOR AND FOR METHOD MANUFACTURING SUCH A DEVICE

[75] Inventors: Daniel Ostrowsky; Louis Marcel Reiber; Raymond Poirier, all of Paris, France

[73] Assignee: Thomson-CSF, Paris, France

[22] Filed: Apr. 16, 1974

[21] Appl. No.: 461,406

[30] Foreign Application Priority Data

Apr. 20, 1973 France .............................. 73.14633

[52] U.S. Cl. .......... 250/227; 350/96 WG; 350/96 C
[51] Int. Cl. .............................................. G02b 5/14
[58] Field of Search ................ 350/96 WG; 250/227

[56] References Cited

OTHER PUBLICATIONS

Stoll et al., "Applied Physics Letters," 15 Dec. 1973 pp. 664–665.

*Primary Examiner*—R. V. Rolinec
*Assistant Examiner*—Darwin R. Hostetter
*Attorney, Agent, or Firm*—Cushman, Darby & Cushman

[57] ABSTRACT

The present invention describes a structure which, on one and the same semiconductor substrate, couples optical waveguides, enabling the processing of a light signal by integrated optical methods, with photodetectors and possibly also with the associated electronic systems, in order to convert the light signal into an electrical signal and effect possible processing of the latter by the use of conventional microelectronic elements.

8 Claims, 5 Drawing Figures

INTEGRATED OPTICAL DEVICE ASSOCIATING A WAVEGUIDE AND A PHOTODETECTOR AND FOR METHOD MANUFACTURING SUCH A DEVICE

The present invention relates to an integrated optical device. It utilises the integrated circuit technology employed in sub-miniaturised electronic systems, in order, commencing with a semiconductive substrate, to create a structure which combines an optical waveguide and a light detector.

The utilisation of fibres for the transfer of information carried by electromagnetic radiation at optical frequencies, poses delicate problems where the reception of said information is concerned : it is then necessary to individually couple, with very high accuracy, the optical fibre and the light detector, whilst at the same time limiting as far as possible the light losses occurring at the interface.

The invention seeks to overcome this problem by applying the methods of production of junctions, thin films, masking and etching, currently employed in the manufacture of electronic integrated circuits in order to produce on one and the same substrate, all the optical guidance and detection elements. A structure of this kind thus exhibits the dual advantage of making it possible at the same time to process the light signal using integrated optical techniques (coupling-filtering), and to process the electrical signal, following detection, using conventional sub-miniaturised electronic elements (amplifier etcetera).

For a better understanding of the present invention, and to show how the same may be carried into effect, reference will be made to the ensuing description and the attached figures, among which :

Figure 1:
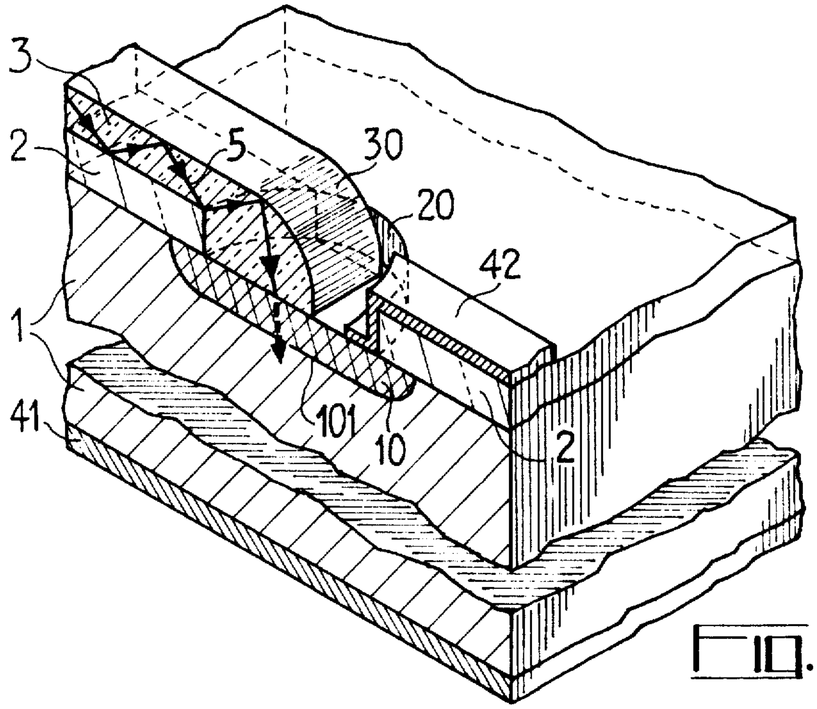
FIG. 1 illustrates a device in accordance with the invention, comprising a special coupling structure between the waveguide and the photodetector.

As FIGS. 1, 2, 3, and 4 illustrate, the device in accordance with the invention essentially consists of :

a substrate 1 constituted by a semiconductor material having a given conductivity type (n or p) ;

a region 10 arranged in the superficial zone of the substrate 1 and having a conductivity type (p or n), differing from that of the substrate, the junction 101 between the regions 10 and 1 constituting the photodetector ;

a dielectric layer 2 uniformly covering the surface of the substrate with the possible exception of the junction location, the refractive index of said layer, vis-a-vis the radiation received by the photodetector and transmitted by the waveguide with which the structure is to be equipped, being $n_2$ and the minimum thickness of the layer being in the same order of magnitude as the wavelength of the radiation in question ;

a waveguide 3 arranged at the surface of the layer 2 in the form of a strip at least partially covering the junction, the thickness of which strip is in the same order of magnitude as the wavelength of the radiation transmitted and whose width can be equal to several times said same wavelength ; the material of which said waveguide is made is chosen so that it has the highest possible transparency vis-a-vis the radiation in question, and that its refractive index $n_3$ is higher than the index $n_2$ of the material of which the layer 2 is made ;

two metal electrodes 41 and 42 which effect ohmic contacts with the two regions, n and p of the junction, the electrode 41 uniformly covering the blank face of the substrate and the electrode 42 taking the form of a metal strip deposited on the surface of the dielectric layer 2 and effecting contact with the region 10.

It goes without saying that although, for reasons of simplicity, a single photodetector and single waveguide have been shown in FIGS. 1, 2, 3 and 4, the structures in accordance with the invention generally comprise a large number of photodetectors and waveguides. In addition to photodetectors, the superficial zone of the substrate can exhibit various other elements : diodes, transistors, resistors, capacitors, constituting conventional integrated micro electronic circuits. As far as the waveguides are concerned, their shape is not necessarily rectilinear and they are capable of performing the conventional integrated optical functions : filtering and coupling for example.:

By way of example, it is possible to utilise, in the devices shown by FIGS. 1 to 4, as substrate 1 a monocrystalline silicon wafer of n type, in which the photodetector junctions are produced by creating a p-conductive region 10 using boron diffusion operations. The dielectric layer 2 can then, employing a conventional technique, take the form of a silica $SiO_2$ layer of around 1 $\mu$m in thickness produced by superficial oxidation of the substrate ; its refractive index, in the wavelength range corresponding to the visible spectrum, is $n_2 = 1.46$. In order to form the waveguide 3, a borosilicate glass can be used. (B 6956 for example), having a refractive index of $n_3 = 1.55$, deposited by cathode-sputtering techniques in a thickness of 0.5 to 1 $\mu$m. Aluminium deposited by vaporisation under vacuum, is used to form the electrodes 41 and 42.

FIGS. 1, 2, 3 and 4 furnish various examples in accordance with the invention, which make it possible within the general context of the structure described hereinbefore, to couple the waveguide with the photodetector.

In FIG. 1, the coupling is effected by distortion of the waveguide. An opening or window 20 is formed in the dielectric layer 2, above the region 10, in order to expose the surface of said region; the guide 3 bends on arrival above the window 20, enters the window and comes into contact with the region 10. As FIG. 1 shows, the zone of curvature 30 thus produced in the waveguide, compels a light ray 5 propagating as a consequence of a series of total reflections at the walls, to enter the region 10 at an angle of incidence close to the normal.

Figure 5:
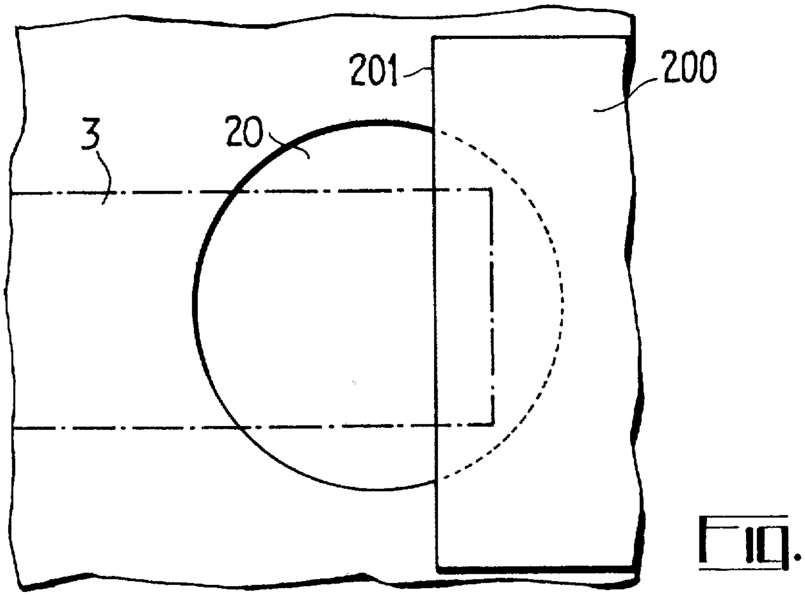
FIG. 5 is an explanatory figure pertaining to a method of producing the device in accordance with the invention.

In the previously described case where the substrate is a silicon wafer and the dielectric layer is a silica layer, the structure of FIG. 1 can be produced by adopting the following procedure :

a. an n-type silicon wafer is coated on one of its faces with a uniform silica layer 1 $\mu$m in thickness approximately, using a thermal oxidation process carried out in a water vapour flow at about 1000° C.

b. a uniform photo resist layer is deposited upon the surface of the silica layer and then exposed through a photographic mask so that the whole of the photo resist surface, with the exception of those areas corresponding to the windows 20, is illuminated ; the emulsion is then developed and the unexposed regions are eliminated by immersion in a solvent ; the silica deposited in these regions is eliminated by immersion in a solution of hydrofluoric acid following which the photo resist layer is removed from the wafer ; thus, windows 20 are produced in the layer 2 of $SiO_2$.

c. the wafer, after being placed in an oven which is raised to a temperature of around 1000° C, is subjected to the action of a boron-charged nitrogen flow ; the boron enters through the windows 20 and diffuses into the silicon creating p-type regions 10 there.

d. a uniform metal layer (for example aluminium), is subsequently deposited by vaporisation under vacuum, on the surface of the wafer and then covered with a photo resist layer ; using the technique set out in item b), it is contrived that only those zones of the area which correspond to the electrodes 42 are protected by the resin; those parts of the metal layer which are not so protected, are dissolved by immersion of the wafer in an acid bath, following which the photo resist layer is eliminated ; in this fashion the electrodes 42 are created.

e. as shown in FIG. 5 a rectangular silica wafer 200 around 1 mm in thickness approximately, is positioned above each window 20, partially covering the same ; the edge 201 of the silica wafer is disposed perpendicularly to the axis of the waveguide 3 which is to be created ; a uniform layer of borosilicate glass is then deposited by cathode-sputtering on that surface of the silicon wafer which is already covered with silica. The shadow effect created by the silica wafer 20, produces, in the window 20, the curved region marked 30 in FIG. 3.

f. by a method similar to that described in item (d), a protective metal layer (chromium, aluminium or manganese), following the contour of the waveguides it is intended to produce, is deposited upon the surface of the borosilicate layer.

g. the borosilicate layer is etched, at those of its areas unprotected by the metal layer, using ion etching, until the underlying silica layer is reached ; in this fashion, the waveguides 3 are produced.

The operations (a), (b) and (c) are conventional operations encountered in integrated circuit work. They can be multiply executed if it is desired to integrate into the silicon substrate, other more complex electronic elements than the photodetectors. It should be pointed out, nevertheless, that the significance of this method is that the silica layer, which conventionally serves as a mask during diffusion operations, is ultimately employed as a dielectric layer of low index, which makes it possible to isolate the waveguides from the silicon substrate.

Figure 2:
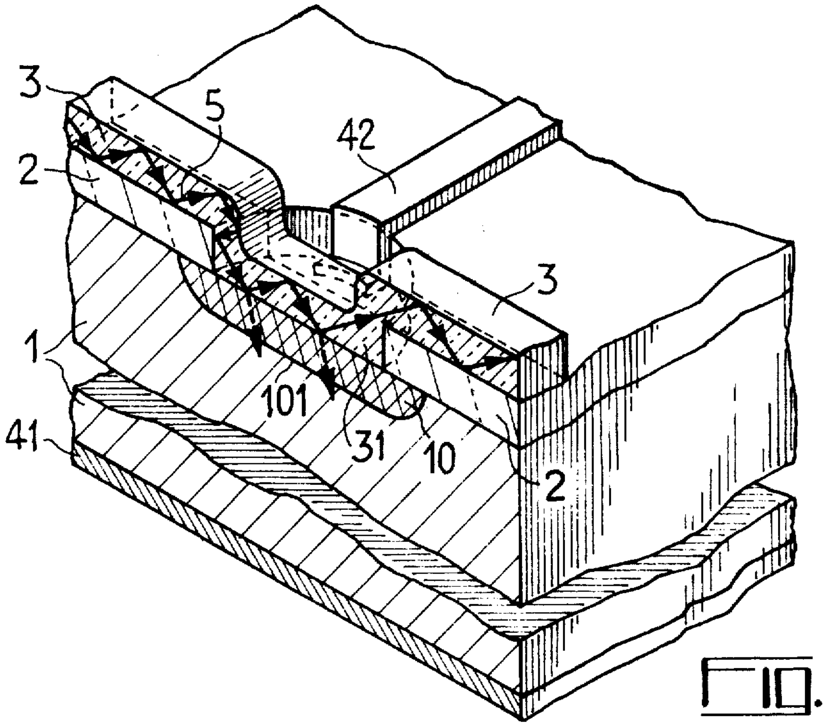
FIGS. 2, 3 and 4 illustrate the device in accordanace with the invention, using other kinds of coupling structures between the waveguide and the photodetector.

FIG. 2 illustrates another coupling structure between the waveguide and the photodetector, which is designed in such a fashion that only part of the radiant energy transmitted by the waveguide is picked up by the detector. It will be seen from this figure, that the waveguide 3 enters said window and leaves it in such a fashion that the whole of the portion 31 located inside the window is in contact with the photodetector. It will be seen, furthermore, that the light ray 5 which propagates by total reflection at the wall of the waveguide 3 in contact either with the dielectric 2, of refractive index $n_2 < n_3$, or with the surrounding air, is progressively absorbed in the region 31, where reflection at the glass-substrate interfaces is only partial, the refractive index of the substrate being higher than that of the material of which the waveguide is made ; ultimately, only a small fraction of the radiation, coming from the left-hand part of the waveguide, enters the right-hand part where it continues to propagate.

The production of this kind of structure, commencing with a silicon substrate, differs from the procedure hereinbefore described in respect of the structure shown in FIG. 1, solely by the omission, in stage e), of the silica protective wafer 200 above the window 20.

Figure 3:
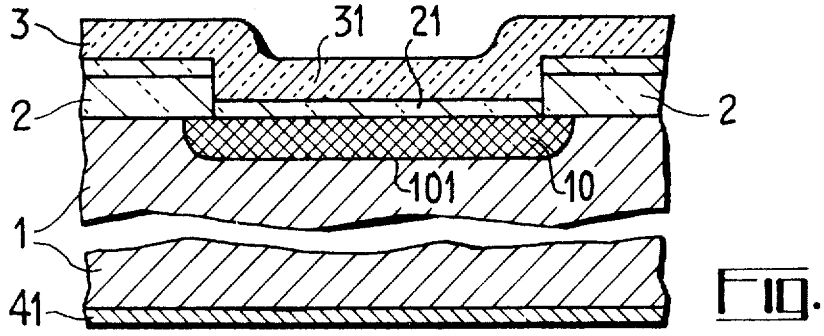

The structure shown in FIG. 3 is a variant embodiment of that shown in FIG. 2, designed to achieve better adjustment of the partial coupling between the waveguide and the detector. Between the part 31 of the waveguide 3, located in the window, and the substrate, there is arranged a dielectric layer 21 made of the same material as the layer 2 but of substantially smaller thickness ; the thickness of said layer 21 is therefore substantially less than the wavelength of the radiation transmitted by the waveguide. The evanescent wave propagating through the thin layer 21 provide, the coupling between the waveguide and the photodetector; this coupling is therefore the tighter the thinner the said layer is in comparison with the wavelength. Thus, depending upon the layer thickness, the coupling can be adapted to the desired value.

To obtain this structure, commencing from a silicon substrate, the stages (a), (b), (c) and (d) hereinbefore described in respect of the embodiment of FIG. 1, are followed. Once diffusion has been carried out and the electrodes deposited, a second oxidising operation is carried out of sufficiently short duration to ensure that the oxide layer 21 deposited in the window, is sufficiently thin. The glass layer is then deposited over the whole of the surface without any need to protect the windows. Then the steps (f) and (g) are carried out.

Figure 4:
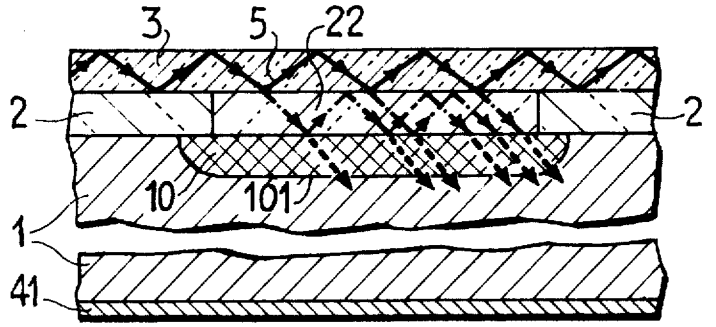

FIG. 4 illustrates another example of a structure which makes it possible to effect partial coupling between the waveguide and the photodetector. It will be seen that above the region 10 of the substrate, at the position occupied in the other configurations by the window 20, there is a dielectric layer 22 of the same thickness as the layer 2 ; the dielectric which makes up said layer 22 is transparent to the radiation transmitted by the waveguide 3 and has a refractive index $n_{22}$ greater than that $n_3$ of the waveguide and less than the refractive index of the substrate. In this structure, in contrast to the previous ones shown in FIGS. 1, 2 and 3, the waveguide 3 exhibits no deformation opposite the region 10, corresponding to the photodetector. When the light rays transmitted by the waveguide, as for example the ray 5, arrive at the interface between the waveguide and the layer 22, they no longer experience total reflection since the condition $n_{22} > n_3$ applies, but instead undergo partial reflection and part of the light energy enters the layer 22 and passes thence into the photodetector. The coupling between the waveguide and the photodetector is the tighter the higher the ratio between the two indices $n_{22}/n_3$.

The structure described in FIG. 4 can be produced by commencing, as before, with a silicon substrate and by subsequently modifying the operations described in relation to FIG. 1.

The operations (a), (b) and (c) are carried out, these enabling the integration of photodetectors into the substrate to take place, and possibly of other electronic elements.

The $SiO_2$ layer is then completely dissolved by immersion in a hydro-hydrofluoric bath. Then, the operation (d) is carried out, this making it possible to deposit the metal electrodes, whereafter the operation (a) is performed again in order to create at the surface of the substrate, including the regions 10, a new silica layer of the desired thickness. By using conventional masking techniques, the surface of this new layer, which forms the regions 2 shown in FIG. 4, is protected, with the exclusion of the elements located opposite the regions 10. Then, into the regions unprotected by the silica layer, there is made to penetrate either by diffusion or by ion-implantation, an impurity which increases the refractive index, for example lithium, in order to create the regions 22. Finally, the waveguides are deposited upon the surfaces of the layers 2 and 22, using the operations (e), (f) and (g) but dispensing, of course with the protective wafers.

What we claim is:

1. An integrated optical device associating at least one optical waveguide for guiding a light wave with at least one photodetector for receiving at least part of said lightwave, and comprising :

a flat substrate of a semiconductor material having a given conductivity type and including upon one of its faces at least one region having a conductivity of the opposite type to that of the substrate, the junction between said region and said substrate forming said photodetector ;

a first dielectric layer arranged upon the same face of the substrate as said region, said first dielectric layer having a thickness at least equal to the wavelength of said light wave and including a window opposite said region;

a second dielectric layer, forming said waveguide, arranged at the surface of said first layer and at least partially covering said region within said window, said second dielectric layer having a thickness close to the wavelength of the said lightwave, being transparent to said lightwave and having a refractive index higher than that of the first layer.

2. An integrated optical device as claimed in claim 1, wherein said waveguide is in direct contact with said region in said window.

3. An integrated optical device as claimed in claim 2, wherein one end of said waveguide is located over said region, the thickness of said waveguide progressively diminishing towards zero in said window.

4. An integrated optical device as claimed in claim 2, wherein said waveguide diametrally traverses said window.

5. An integrated optical device as claimed in claim 1, further comprising a dielectric coupling layer transparent to said lightwave and having a thickness at the most equal to that of said first layer, said dielectric coupling layer being arranged within said window between said region and said second layer.

6. An integrated optical device as claimed in claim 5, wherein said coupling layer is made of the same material as said first layer and has a thickness less than that of said first layer.

7. An integrated optical device as claimed in claim 5, wherein said coupling layer has the same thickness as said first layer and has a refractive index greater than that of said second layer.

8. An integrated optical device as claimed in claim 1, wherein said semiconductor material is silicon and said second layer is a silica layer.

* * * * *